Aug. 19, 1930.　　　　J. W. GRIM　　　　1,773,672
CULTIVATOR
Filed Dec. 4, 1928　　3 Sheets-Sheet 3
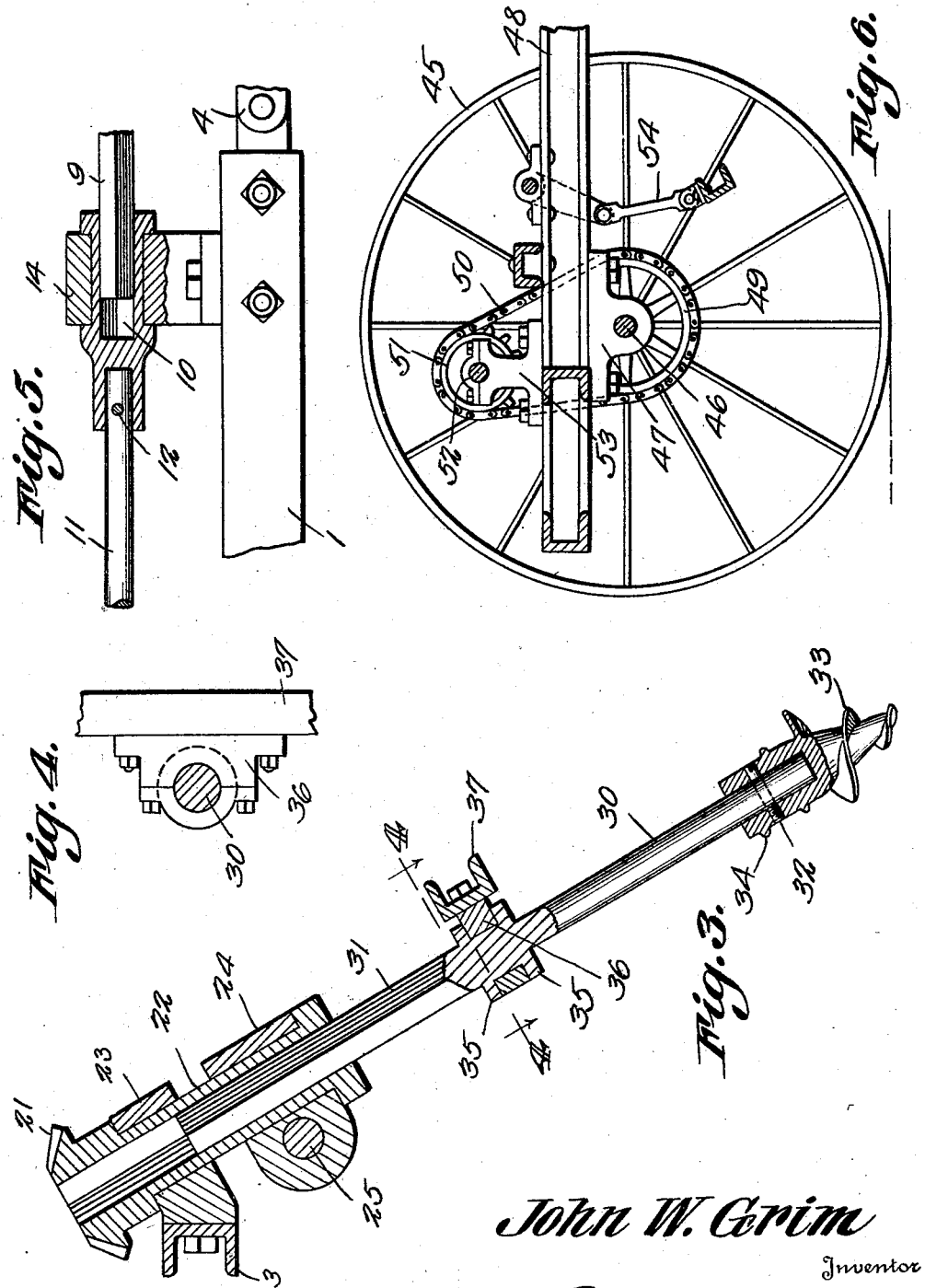
John W. Grim
Inventor
By C A Snow & Co.
Attorneys Patented Aug. 19, 1930

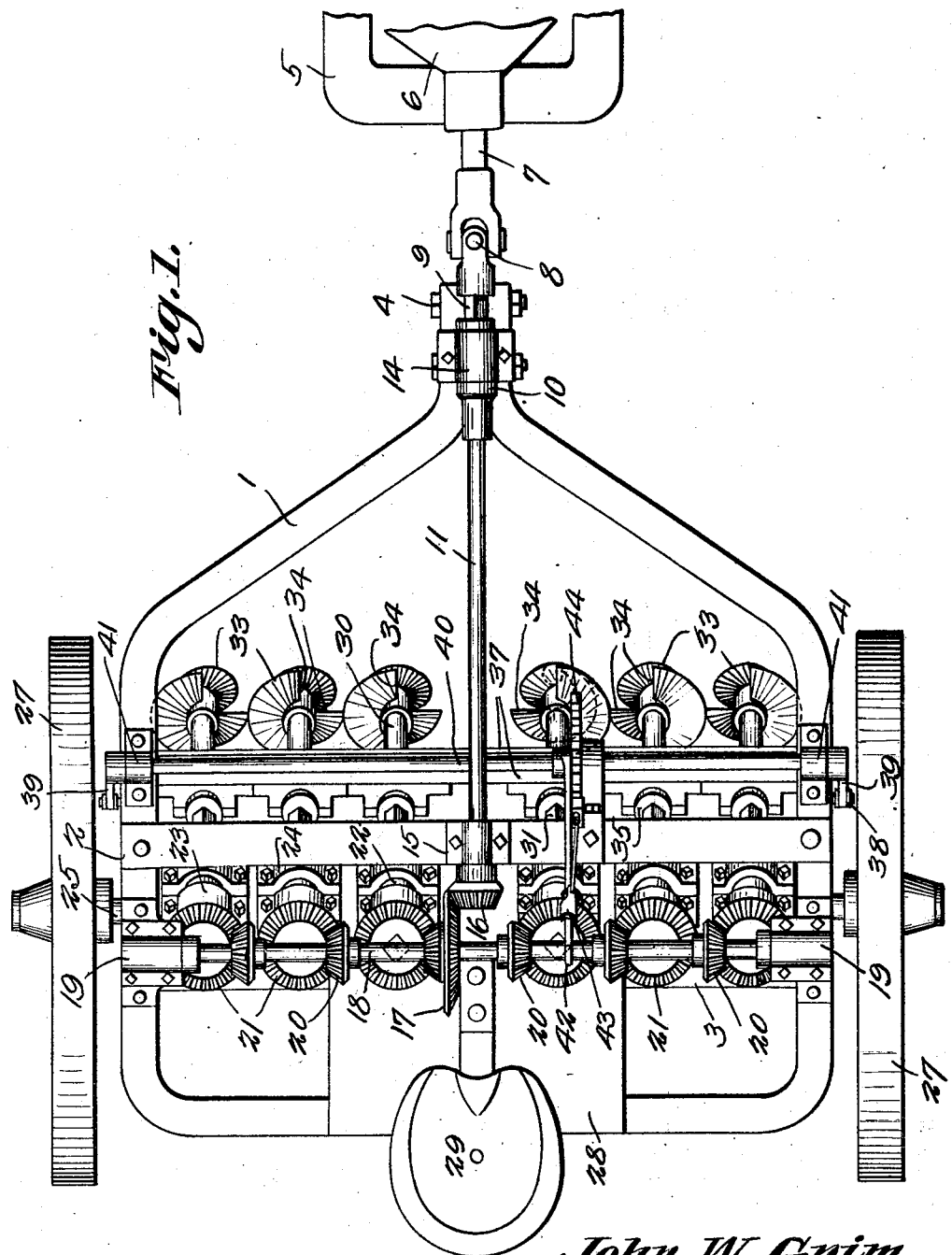

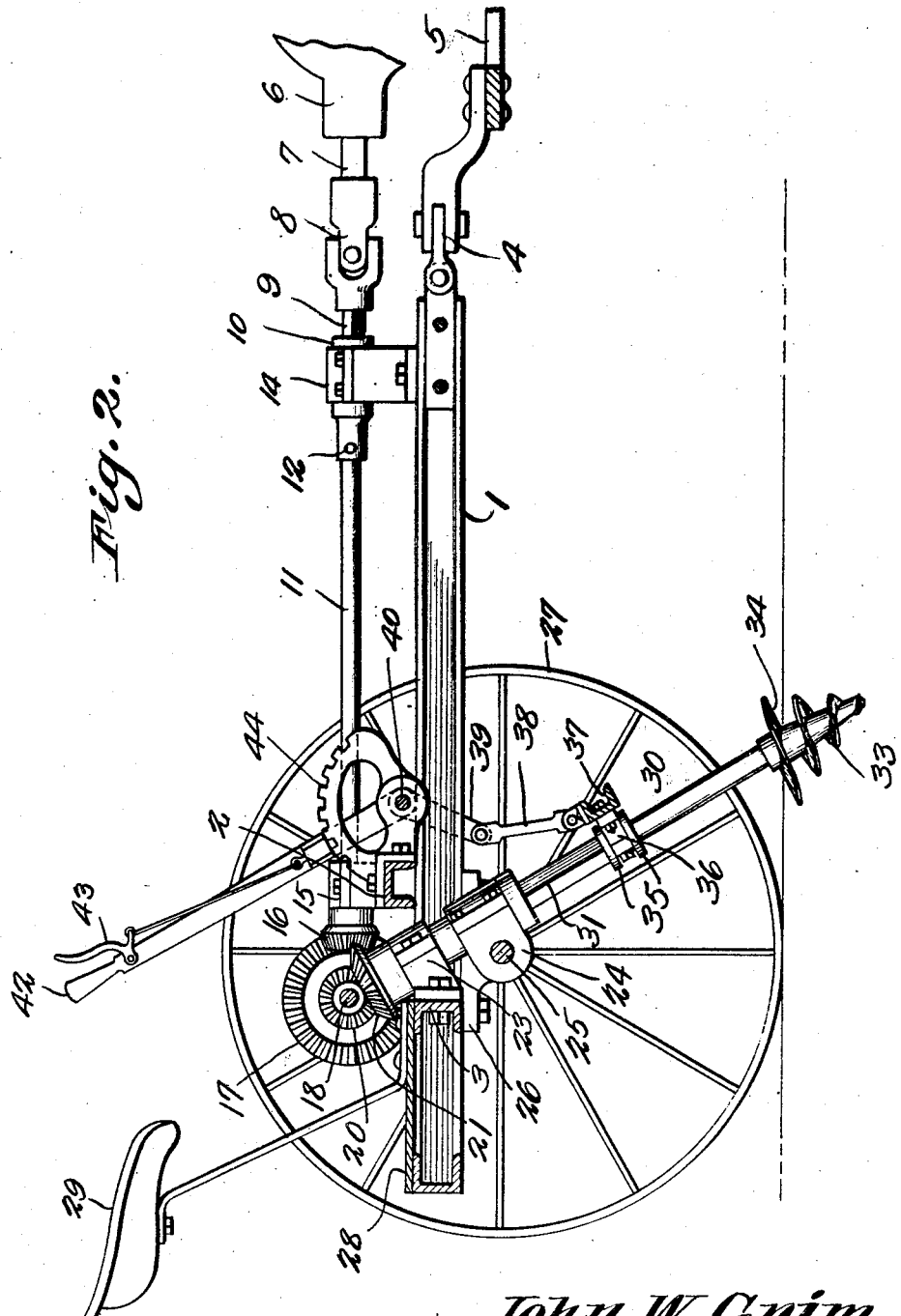

1,773,672

UNITED STATES PATENT OFFICE

JOHN W. GRIM, OF FELTON, PENNSYLVANIA, ASSIGNOR OF ONE-FOURTH TO WILLIAM P. BAKER, OF ABBOTSTOWN, PENNSYLVANIA, AND ONE-FOURTH TO DANIEL E. BRANDT AND ONE-FOURTH TO EUGENE ELGIN, BOTH OF EAST BERLIN, PENNSYLVANIA

CULTIVATOR

Application filed December 4, 1928. Serial No. 323,695.

The invention aims to provide a novel form of cultivator in which the soil engaging elements will be peculiarly effective in breaking up the earth, in that they pass through the soil horizontally, and at the same time, operate like screw conveyors to elevate the soil. Another object of the invention is to provide novel means whereby the soil engaging elements can be placed close together so that there will be no gaps between them. A further object of the invention is to provide novel means for operating and controlling the soil engaging elements.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in plan, a device constructed in accordance with the invention;

Figure 2 is a longitudinal section wherein many parts appear in elevation;

Figure 3 is a vertical section taken through one of the soil engaging members and dependent parts;

Figure 4 is a transverse section on the line 4—4 of Figure 3;

Figure 5 is a sectional view showing parts of one of the shafts;

Figure 6 is a vertical longitudinal section showing a modification.

Having reference to the forms shown in Figures 1 to 4 of the drawings, there is provided a cultivator comprising a frame 1 including an upper transverse bar 2, and a lower transverse bar 3 disposed behind and at the rear of the bar 2, as Figure 2 will show, when compared with Figure 1.

At the forward end of the frame 1 there is a draft hitch 4, of any desired construction, whereby the frame 1 is connected to a tractor, a part of which is shown in the drawings and designated by the numeral 5.

The construction of the hitch 4 is such that the forward end of the frame 1 can move both vertically and horizontally with respect to the hind end of the tractor 5. The tractor 5 may include an engine 6, the shaft of the engine being marked by the numeral 7.

The rear end of the shaft 7 of the engine 6 is connected by a universal joint 8 to a shaft section 9 which is squared in cross section, the shaft section 9 fitting in a socket 10, the construction being such that the shaft section 9 can slide lengthwise in the socket, the socket being rotated when the shaft section 9 is rotated. The forward end of a shaft section 11 is secured at 12 in the rear end of the socket 10. The parts 9—10—11 may be referred to as a longitudinally extensible shaft. The socket 10 is held and rotated in a bearing 14 on the forward end of the frame 1, the shaft section 11 being held for rotation in a bearing 15 that is secured to the upper transverse bar 2 of the frame 1.

On the rear end of the shaft 11 there is a bevelled pinion 16 meshing with a bevelled gear 17 secured to a countershaft 18 extended transversely of the line of advance of the cultivator, the ends of the shaft 18 being journaled in bearings 19 on the sides of the frame 1. There are bevelled pinions 20 which are secured to the countershaft 18.

The bevelled pinions 20 mesh with bevelled gears 21 mounted on sleeves 22. The sleeves 22 are journalled in bearings 23 mounted on the lower transverse bar 3 of the frame 1. The sleeves 22 are journaled, also, in bearings 24 mounted on the axle 25 of the cultivator, the axle being carried by bearings 26 (Figure 2) on the frame 1 of the machine. The axle 25 carries the rotatable ground wheels 27 that support the cultivator. A platform 28 extends between the lower transverse bar 3 and the back end of the frame 1. On the platform 28, a seat 29 is mounted.

The numeral 30 marks a downwardly and forwardly inclined shaft having a squared end 31 received in the sleeve 22. The construction is such that, although the end 31 of the shaft 30 can slide in the sleeve 22, rotation will be imparted to the shaft 30 by way of its squared end 31 when the sleeve 22 is rotated. There may be as many of the shafts 30 as desired. Six of them are shown in the drawings, but this number may be increased or decreased, as occasion may require. On the lower end of the shaft 30 is secured, at 32, a soil engaging element in the form of an auger having a spiral flange 33, the auger tapering from its upper end to its lower end. The flanges 33 of adjacent soil engaging elements are cut away at their upper ends, as shown at 34 in Figure 1. This enables the wide upper ends of the soil engaging elements or augers to be placed in slightly overlapping relation, and still clear each other as they rotate.

A means is provided whereby the shafts 30, and with them the soil engaging augers 33, may be adjusted up and down, and with this end in view, each of the shafts 30 has collars 35 between which is located a bearing 36 in which the shaft 30 turns. The bearings 36 are united by a connector, in the form of a channel bar 37, which extends across the machine from side to side, as Figure 1 will show. The bar or connector 37 is located below the frame 1, and links 38 are pivoted to the ends of it. The upper ends of the links 38 are pivoted to crank arms 39 on an adjusting shaft 40 extended entirely across the frame 1, from side to side, and journaled in bearings 41 on the sides of the frame 1. A lever 42 is connected to the shaft 40 and is so placed that it is accessible to a person occupying the seat 49. The lever 42 carries a latch mechanism 43 cooperating with a segment 44 secured to the upper transverse bar 2. The shaft 40 is journaled in the segment 44.

The engine 6 on the tractor 5 rotates the shaft 7, and rotation is imparted to the shaft section 11 by the universal joint 8, the shaft section 9, and the socket 10. The shaft section 11 rotates the bevelled pinion 16, and the pinion 16, cooperating with the gear 17, rotates the countershaft 18. When the countershaft 18 is rotated, the bevelled pinions 20 cooperate with the bevelled gears 21 to rotate the sleeves 22 in end bearings 23 and 24, and when the sleeves 22 are rotated, rotation is imparted to the shafts 30, because the ends 31 of the shafts 30 are held in the sleeves 22 against rotation independently of the sleeves. When the shafts 30 are rotated, the soil engaging elements or augers 33 are rotated, the soil being raised as the augers 33 move forwardly through the soil with the machine as it is advanced. The result is that the soil not only is broken up thoroughly, but at the same time, is raised. The bevelled pinions 20 are so arranged with respect to the gears 21 (Figure 1) that the soil engaging elements 33 on one side of the median plane of the machine will turn in one direction, whereas the soil engaging elements on the opposite side of the median plane of the machine will turn in an opposite direction. This results in a thorough breaking up of the soil, and at the same time, side draft is avoided.

The operator can lock the shaft 40 by means of the lever 42, the lever being held in any position to which it may have been adjusted by engaging the latch mechanism 45 with the segment 44. When the shaft 40 is locked, the arms 39 on the shaft move up and down, the links 38 causing the connector or bar 37 to move up and down carrying with it the bearings 36. The bearings 36 cooperate with the collars 35 to raise and lower the shaft 30, the soil engaging elements 33 being adjusted accordingly with respect to the surface of the soil. When the shafts 30 are raised or lowered their square ends 31 slip up and down in the correspondingly shaped bores of the sleeves 22.

It is not necessary that motive power for the machine be derived from an independent source such as a tractor. In the form shown in Figure 6, the power is derived from one or both of the ground wheels 45, the wheels 45 being carried by the axle 46. The axle is journaled in bearings 47 on the frame 48 of the vehicle. Sprocket wheels 49 turned with the ground wheels 45 and are engaged by sprocket chains 50 cooperating with sprocket wheels 51 on a shaft 52 journaled in bearings 53 on the frame of the machine. The shaft 52 corresponds to the shaft 18 of Figure 1 and does the same work as the shaft 18, and by the same means hereinbefore described, to wit, the bevelled pinions 20, the gears 21, and other parts shown in Figure 3. The means for raising and lowering the engaging elements in Figure 6 is marked as a whole by the numeral 54, and is of the kind hereinbefore described.

So far as operation is concerned, the characteristic feature of Figure 6 is that the countershaft 52, corresponding to the countershaft 18, is rotated by means of the sprocket wheels 49 and 51, the chains 50, and the ground wheels 45, rather than by the engine-driven shaft 11 of Figure 1.

What is claimed is:—

1. In a cultivator, a wheel mounted frame, depending shafts journaled on the frame, means for rotating the shafts, and soil engaging augers on the lower ends of the shafts, the augers having spiral flanges, and the flanges being cut away so that the flange of one auger can clear the flange of an adjoining auger when the augers are rotated by the shafts.

2. In a cultivator, a wheel-mounted frame, augers comprising upper and lower parts, the upper and lower parts of each auger being connected for rotation together, and being telescoped for free right-line sliding adjustment, so that the lower parts of the augers may be raised and lowered, means for mounting the upper part of each auger on the frame for rotation, with the upper and lower parts of each auger in a fixed axis at an angle to the soil, means under the control of an operator for imparting right-line sliding movement to the lower parts of the augers, thereby to move the lower parts of the augers up and down in said axis and to adjust the lower parts of the augers with respect to the soil, and mechanism for rotating the upper parts of the augers.

3. In a cultivator, a wheel-mounted frame, augers comprising upper and lower parts, the upper and lower parts of each auger being connected for rotation together, and being telescoped for free right-line sliding adjustment, so that the lower parts of the augers may be raised and lowered, means for mounting the upper part of each auger on the frame for rotation, with the upper and lower parts of each auger in a fixed axis at an angle to the soil, a bar extended transversely of the frame, bearings on the bar, the lower parts of the augers being journaled in the bearing and being held against longitudinal movement therein, mechanism connected to the bar and the frame and under the control of an operator for raising and lowering the bar, thereby to impart right-line sliding movement to the lower parts of the augers, and to move the lower parts of the augers up and down in said axis and to adjust the lower parts of the augers with respect to the soil, and mechanism for rotating the upper parts of the augers.

4. In a cultivator, a wheel-mounted frame, augers comprising upper and lower parts, the upper and lower parts of each auger being connected for rotation together, and being telescoped for free right-line sliding adjustment, so that the lower parts of the augers may be raised and lowered, means for mounting the upper part of each auger on the frame for rotation, with the upper and lower parts of each auger in a fixed axis at an angle to the soil, means under the control of an operator for imparting right-line sliding movement to the lower parts of the augers, thereby to move the lower parts of the augers up and down in said axis and to adjust the lower parts of the augers with respect to the soil; and mechanism for rotating the upper parts of the augers, said mechanism comprising bearings on the frame, a transverse shaft journaled in the bearings, intermeshing beveled gears on the upper parts of the augers and on the transverse shaft, a single shaft extended parallel to the line of advance of the vehicle and located approximately midway between the sides of the frame, means for mounting said single shaft for rotation on the frame, and intermeshing beveled gears on said single shaft and on the transverse shaft.

In testimony that I claim the foregoing as my own, I have hereto affixed my signature.

JOHN W. GRIM.